(12) United States Patent
Whitman et al.

(10) Patent No.: US 10,528,088 B2
(45) Date of Patent: Jan. 7, 2020

(54) OPENING STATE DETECTION OF A FOLDABLE DEVICE USING SELF-CAPACITANCE

(71) Applicant: Microsoft Technology Licensing, LLC, Redmond, WA (US)

(72) Inventors: Christopher Andrew Whitman, Fort Collins, CO (US); David Voth, Woodinville, WA (US); Eliyahu Barel, Rosh HaAyin (IL); On Haran, Kfar Saba (IL); Amir Zyskind, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/279,366

(22) Filed: Sep. 28, 2016

(65) Prior Publication Data

US 2018/0088633 A1    Mar. 29, 2018

(51) Int. Cl.
*G06F 1/16* (2006.01)
*G06F 3/044* (2006.01)
*G06F 3/041* (2006.01)

(52) U.S. Cl.
CPC .......... *G06F 1/1677* (2013.01); *G06F 1/1618* (2013.01); *G06F 3/044* (2013.01); *G06F 3/0416* (2013.01); *G06F 3/0446* (2019.05); *G06F 3/0448* (2019.05)

(58) Field of Classification Search
CPC ....................................................... G06F 3/044
See application file for complete search history.

(56) References Cited

U.S. PATENT DOCUMENTS

| | | | |
|---|---|---|---|
| 8,543,166 B2 | 9/2013 | Choi et al. | |
| 9,007,306 B2 | 4/2015 | Liu | |
| 9,164,632 B2* | 10/2015 | Lo | G06F 3/044 |
| 9,207,818 B2 | 12/2015 | Kang et al. | |
| 9,304,348 B2 | 4/2016 | Jang | |
| 2010/0298032 A1* | 11/2010 | Lee | G06F 1/1616 455/566 |
| 2011/0169754 A1* | 7/2011 | Miyazawa | G06F 1/1616 345/173 |
| 2011/0227588 A1* | 9/2011 | Chen | G06F 3/044 324/654 |
| 2013/0100053 A1 | 4/2013 | Kang et al. | |

(Continued)

OTHER PUBLICATIONS

Khalilbeigi, et al., "FoldMe: Interacting with Double-sided Foldable Displays", In Proceedings of the Sixth International Conference on Tangible, Embedded and Embodied Interaction, Feb. 19, 2012, pp. 33-40.

(Continued)

*Primary Examiner* — Patrick F Marinelli

(57) ABSTRACT

An electronic device and method is disclosed that determines a fold angle and/or opening state of a foldable electronic device using a self-capacitance measurement of an electrode disposed in the foldable electronic device. Using self-capacitance to determine the opening state provides an accurate result and makes efficient use of power of the foldable electronic device. Further, the technique offers flexibility in the implementation, as it can make use of electrodes, sensors, and/or antennas already present in many foldable electronic devices.

17 Claims, 13 Drawing Sheets

(56) References Cited

U.S. PATENT DOCUMENTS

| | | | |
|---|---|---|---|
| 2013/0127724 A1* | 5/2013 | Liu | G06F 1/1616 345/168 |
| 2013/0176278 A1* | 7/2013 | Lo | G06F 3/044 345/174 |
| 2013/0234974 A1* | 9/2013 | Guard | G06F 3/044 345/174 |
| 2014/0032623 A1* | 1/2014 | Lablans | G06F 7/584 708/252 |
| 2014/0035869 A1 | 2/2014 | Yun et al. | |
| 2014/0168159 A1* | 6/2014 | Li | G06F 3/0416 345/174 |
| 2014/0232957 A1* | 8/2014 | Lee | G06F 3/041 349/12 |
| 2014/0320393 A1 | 10/2014 | Modarres et al. | |
| 2014/0327845 A1* | 11/2014 | Yashiro | G06F 3/044 349/12 |
| 2015/0116608 A1 | 4/2015 | Jeong | |
| 2015/0169091 A1 | 6/2015 | Ho et al. | |
| 2015/0169109 A1* | 6/2015 | Park | G06F 3/044 345/174 |
| 2015/0193056 A1* | 7/2015 | Bolender | G06F 3/0414 345/174 |
| 2015/0241924 A1* | 8/2015 | Chang | G06F 3/044 349/12 |
| 2015/0370396 A1 | 12/2015 | Hotelling et al. | |
| 2016/0246330 A1* | 8/2016 | Kim | G06F 1/1652 |
| 2016/0381014 A1* | 12/2016 | Kim | H04L 63/0861 726/7 |
| 2017/0052566 A1* | 2/2017 | Ka | G06F 3/0483 |
| 2017/0285837 A1* | 10/2017 | Zeng | G06F 1/1641 |
| 2018/0088633 A1* | 3/2018 | Whitman | G06F 1/1677 |

OTHER PUBLICATIONS

Tarun, et al., "PaperTab: An Electronic Paper Computer with Multiple Large Flexible Electrophoretic Displays", In Proceedings of Extended Abstracts on Human Factors in Computing Systems, Apr. 27, 2013, pp. 3131-3134.

Roudaut, et al., "Morphees: Toward High "Shape Resolution" in Self-Actuated Flexible Mobile Devices", In Proceedings of Extended Abstracts on Human Factors in Computing Systems, Apr. 27, 2013, 10 pages.

* cited by examiner

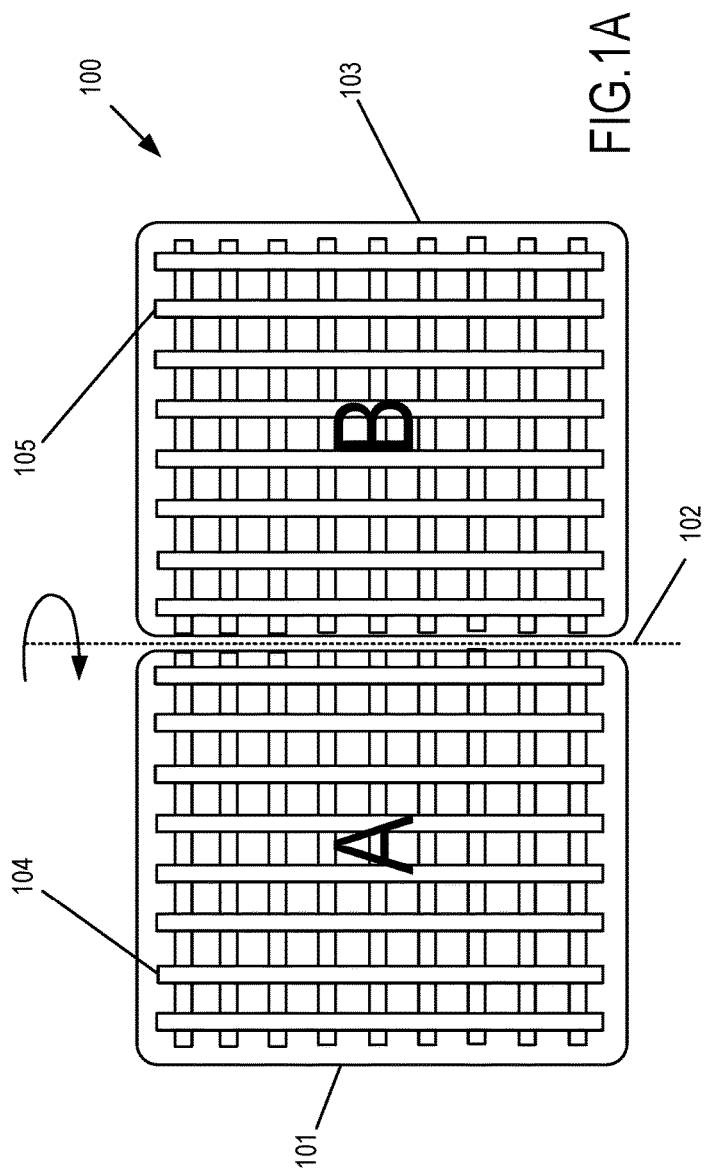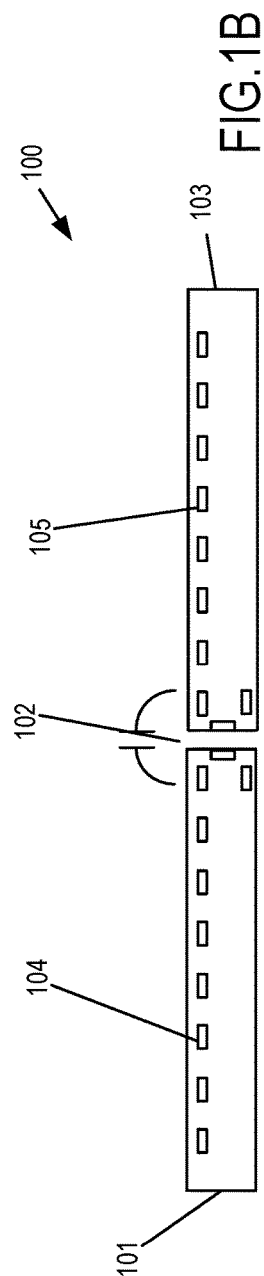
FIG.1A
FIG.1B

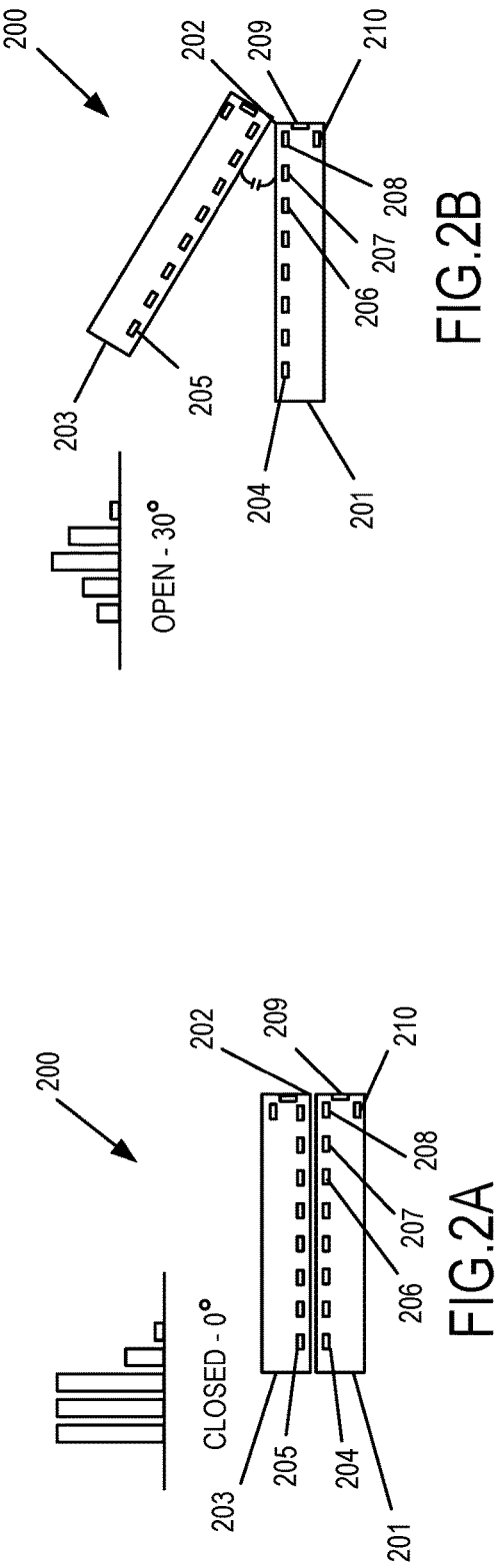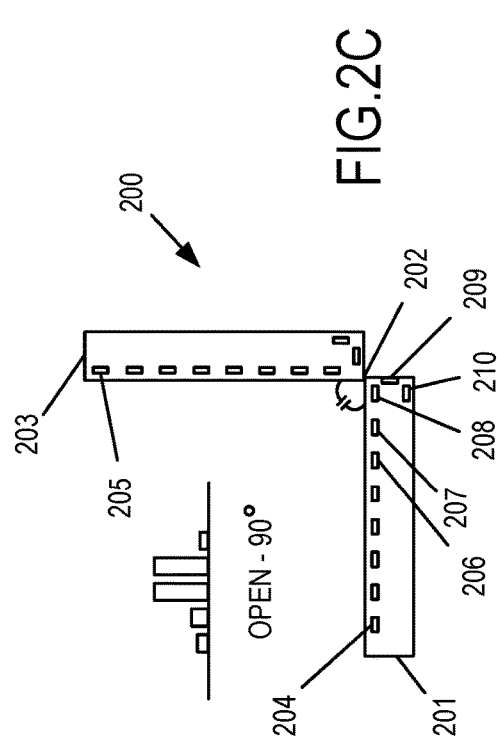

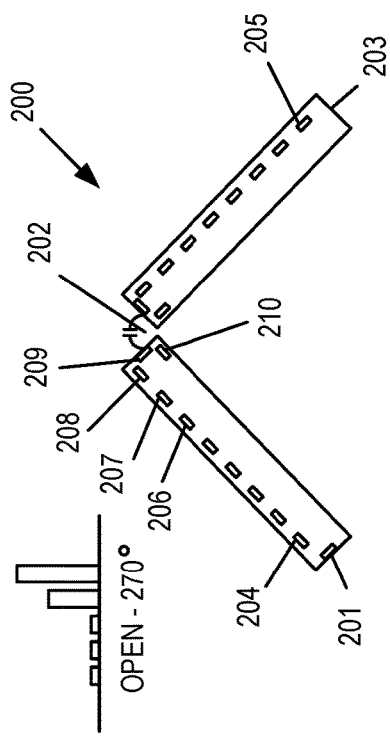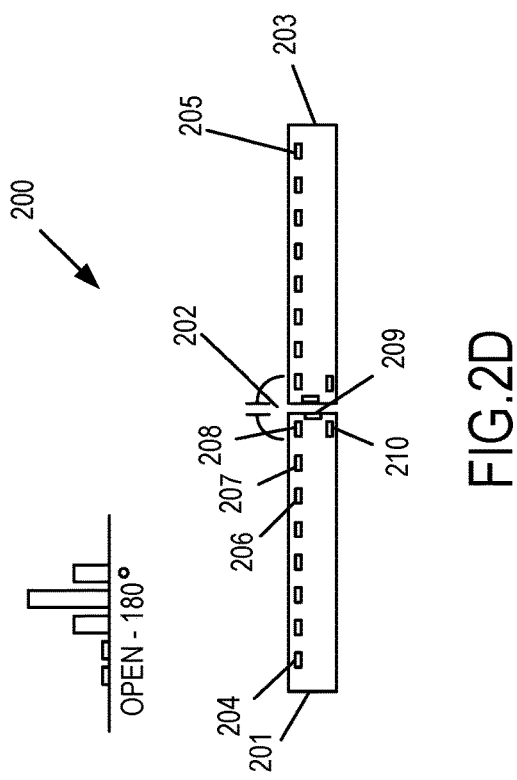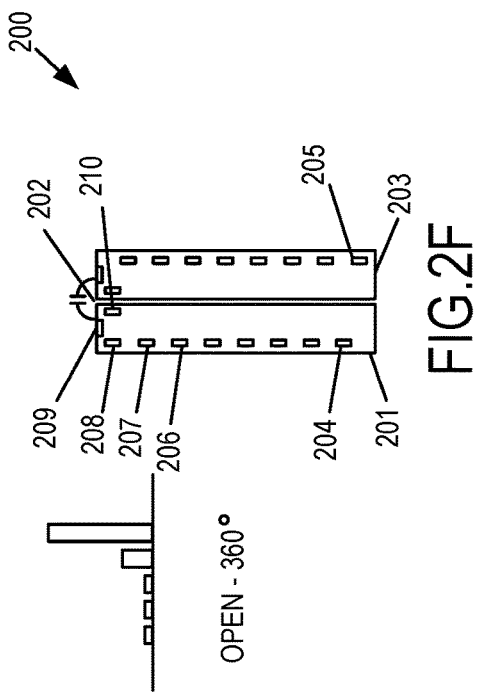

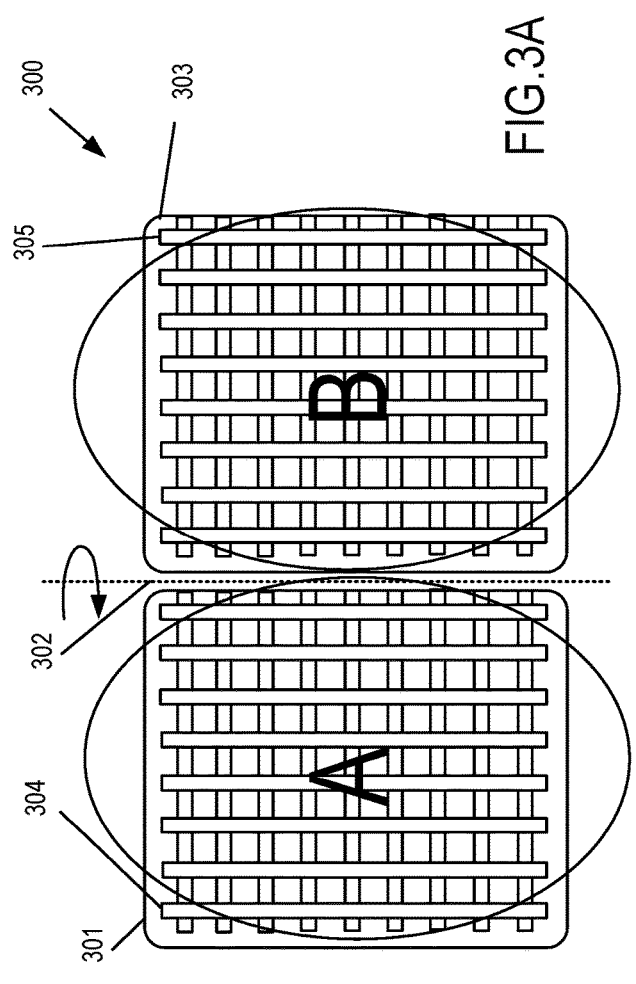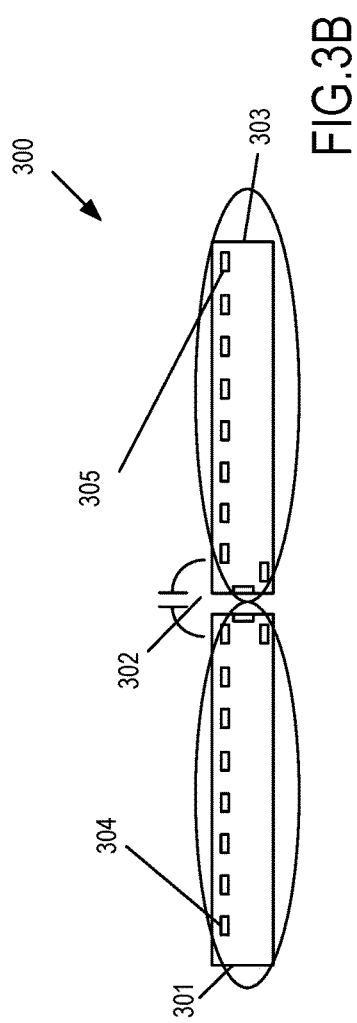
FIG. 3A
FIG. 3B

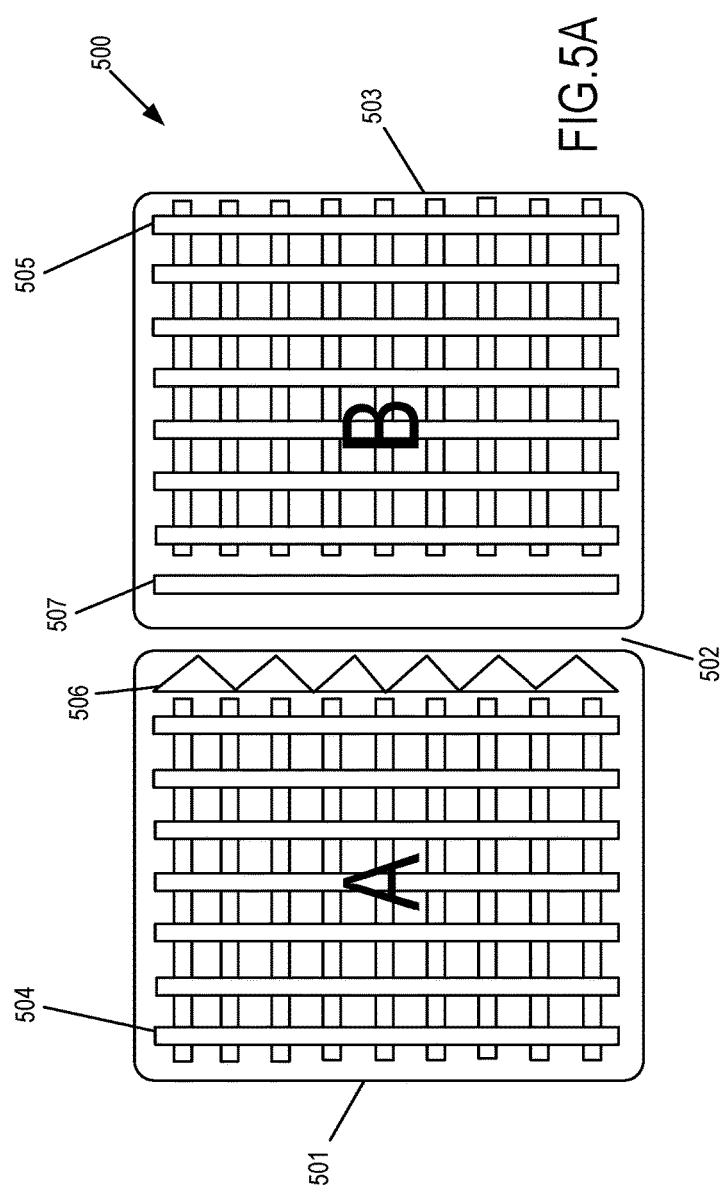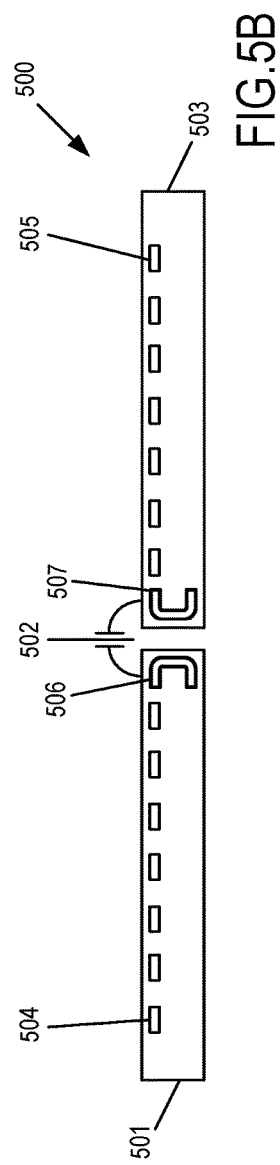
FIG.5A
FIG.5B

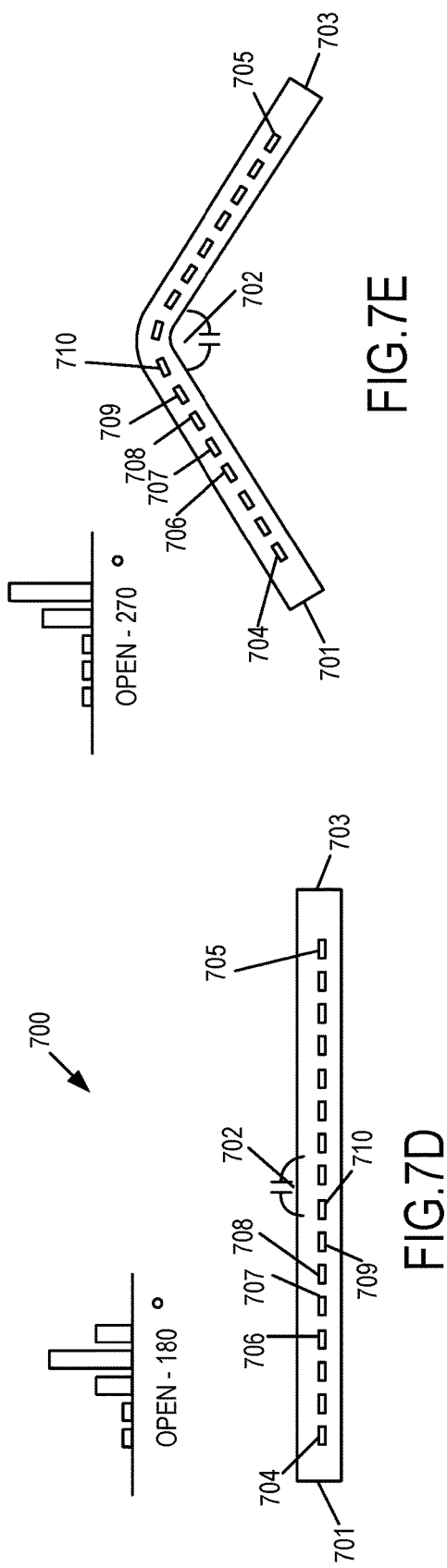

OPENING STATE DETECTION OF A FOLDABLE DEVICE USING SELF-CAPACITANCE

BACKGROUND

Electronic devices are available in a range of form factors, foldable electronic devices being one such form factor. For foldable electronic devices, a fold angle and/or opening state may be determined between at least two portions of the device. Determining a fold angle and/or opening state between two portions may be achieved using a variety of sensors and/or sensing technology. In order for the sensors to function, they must be powered, and in many cases, arrays of multiple sensors on both sides of the fold must be powered in order to determine the fold angle. Some techniques for determining a fold angle and/or opening state have limited accuracy. Further, using some sensing technology requires including the required sensors as additional hardware within the body of the electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An electronic device is disclosed. The electronic device comprises a foldable body portion; at least one powered electrode disposed in the foldable body portion; at least one grounded electrode disposed in the foldable body portion; at least one processor; and at least one memory comprising computer program code, the at least one memory and the computer program code configured to, with the at least one processor, cause the electronic device to at least: obtain a self-capacitance of the at least one powered electrode based on a distance between the at least one powered electrode and the at least one grounded electrode; and calculate a fold angle of a fold in the foldable body portion based on the obtained self-capacitance, wherein a fold axis of the fold is disposed between the at least one powered electrode and the at least one grounded electrode.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 1A and 1B illustrate an electronic device comprising two portions according to an implementation;

FIGS. 2A-2F illustrate schematic side views of an electronic device according to an implementation in various opening states;

FIGS. 3A and 3B illustrate schematic top and side views of an electronic device featuring use of electrodes throughout the device;

FIGS. 5A and 5B illustrate schematic top and side views of electronic devices according to various implementations in a flat position featuring a triangular shaped antenna;

FIGS. 7A-7F illustrate schematic side views of an electronic device comprising a foldable body portion according to an implementation in various open states;

In FIGS. 1A to 11, the electronic devices are illustrated as schematic drawings. The drawings may not be to scale.

DETAILED DESCRIPTION

Figure 4A:
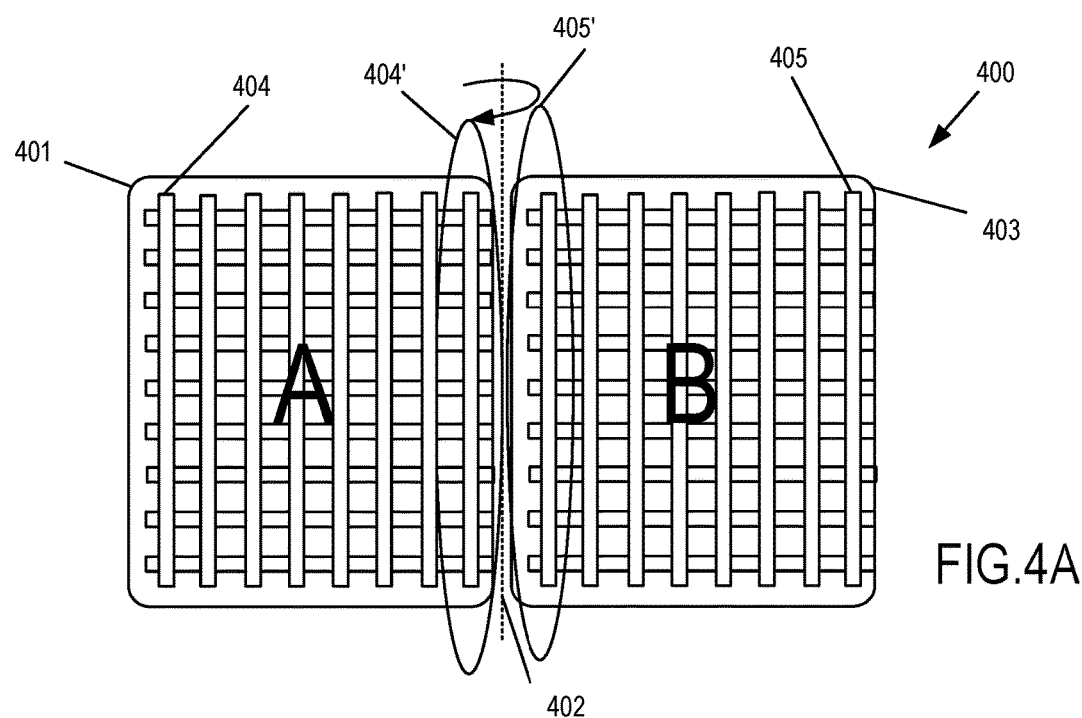
FIGS. 4A and 4B illustrate schematic top and side views of an electronic device featuring use of electrodes in proximity to the hinge only.

The detailed description provided below in connection with the appended drawings is intended as a description of a number of implementations and is not intended to represent the only forms in which the implementations may be constructed, implemented, or utilized. Although the implementations may be described and illustrated herein as being implemented in devices such as a smartphone, tablet computer, or the like, this is only an illustrative implementation and not a limitation. As those skilled in the art will appreciate, the present implementations are suitable for application in a variety of different types of foldable computing devices, for example tablet computers, music players etc., wherein a fold angle is to be determined between at least two portions of the device.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

The electronic devices described below are configured for determining a fold angle and/or opening state of a foldable electronic device using a self-capacitance measurement of as few as one electrode disposed in the foldable electronic device. Using self-capacitance to determine the opening state as described below provides an accurate result and makes efficient use of precious power on what is likely to be a mobile and/or battery powered device. Further, the technique offers flexibility in the implementation, as it can make use of electrodes, sensors, and/or antennas already present in many foldable electronic devices, which means no need for additional hardware. Alternatively, if additional hardware must be added to an electronic device, the described self-capacitance systems and methods require inexpensive hardware elements to implement.

FIGS. 1A and 1B illustrate an electronic device comprising two portions according to an implementation. The electronic device 100 may be, for instance, a mobile device, a tablet computer, a smartphone or a mobile phone, a phablet, a media player, a personal digital assistant, an e-book reader, a game console, a wearable device, a display or a flat-screen television. The electronic device 100 comprises a first portion 101 and a second portion 103 rotatably, e.g. hingedly, foldably, rollably, or the like, connected by a hinge element 102. In an implementation, the hinge element 102 may also be a foldable element. The first portion 101 and the second portion 103 may be separate bodies, joined together by the hinge element 102, or they may be integral parts of the electronic device 100 formed as one single body e.g. by folding a foldable body portion including the first and second portions of the electronic device 100 into two portions. The "hinge element" may refer to any structure providing rotating, folding, rolling, and/or hinged movement between the portions about an axis. The hinge element may include any structural element which allows the portions 101 and 103 to rotate, fold, and/or roll with respect to each other. This movement may be along or substantially along the edges of portions 101 and 103 which are joined via the hinge. In this illustrative implementation, the hinge element 102 is a hinge region. The "hinge region" may refer to any structure providing movement, such as folding, rolling, hinged, or the like, between the portions about an axis; the axis may be perpendicular to the length of the electronic device 100. The hinge region 102 may be a region of the electronic device 100 that is more easily foldable than other parts of the electronic device 100. The hinge region 102 may be any type of hinge region, for instance a live hinge. Further, the electronic device 100 may comprise one, two or more hinge elements, i.e. a plurality of hinge elements.

While some implementations may describe the movement of the two portions about the hinge element with respect to one term (e.g., folding) for ease of description, those skilled in the art will note that other types of movement (e.g., rolling, rotating, etc.) are contemplated in those implementations.

The hinge element 102 may allow various degrees of freedom of rotation or folding between the first and second portions 101 and 103. In an example, the hinge element 102 may provide freedom of rotation from 0 degrees to 180 degrees between the portions 101 and 103, allowing the device to be rotatable or foldable between a completely folded position and a flat position. In the completely folded position, the first portion 101 and the second portion 103 face each other and may rest against each other. In the flat position, the electronic device 100 may be planar or substantially planar.

In an example, the hinge element may provide a freedom of rotation between 0 to 360 degrees. According to another example, the hinge element 102 may provide freedom of rotation in any range selected from 0 to 360 degrees. In another implementation, the hinge element 102 may extend end to end between the edges of the first and second portion 101 and 103. In another implementation, the hinge element 102 may join the edges of the first and second portion 101 and 103 only at certain points along the edges.

The electronic device 100 further comprises electrodes, including electrode 104, disposed in the first portion 101 and electrodes, including electrode 105, disposed in the second portion 103. FIG. 1A illustrates the electronic device 100 as a top view, displaying a network, or grid, of electrodes throughout the first portion 101 and the second portion 103. The electrodes 104 and 105 and other electrodes disposed in the electronic device 100 may further comprise antennas, capacitive-based digitizer sensors, or the like. In an implementation, all of the electrodes (e.g., electrodes 104 and 105, etc.) may be active (e.g., powered, etc.) and a fold angle of the electronic device 100 at the hinge element 102 may be determined based on the mutual capacitance (e.g., based on a detected change in the mutual capacitance, etc.) between the electrodes on the first portion 101 and the electrodes on the second portion 103, wherein the electrodes on one portion act as drivers and the electrodes on the opposite portion act as receivers. The electrodes may comprise materials such as copper, Indium Tin Oxide (ITO), metal mesh, printed ink, and/or the like.

In an alternative implementation, the electrodes in the first portion 101 (e.g., electrode 104, etc.) may be active (e.g., powered, etc.) and the electrodes in the second portion 103 (e.g., electrode 105, etc.) may be grounded. The fold angle of the electronic device 100 at the hinge element 102 may be determined based on the self-capacitance of the active electrodes in the first portion 101 and the effect that the grounded electrodes in the second portion 103 have thereon. Further, the electrodes in the second portion 103 may be active while the electrodes in the first portion 101 may be grounded, such that the fold angle of the electronic device 100 at the hinge element 102 may be determined based on the self-capacitance of the active electrodes in the second portion 103.

It should be understood that, while the electronic device 100 includes a plurality of electrodes and in both the first portion 101 and the second portion 103, the electronic device 100 may comprise more, fewer, and/or differently arranged electrodes in alternative examples. For instance, the electronic device 100 may include one electrode (e.g., electrode 104, electrode 105, etc.) on each of the first portion 101 and the second portion 103.

The electronic device 100 may further comprise a computing apparatus, such as at least one processor and at least one memory comprising computer program code, the computing apparatus being configured to calculate a fold angle of the electronic device 100 as described below.

In an example, the at least one memory and the computer program code are configured to, with the at least one processor, cause the electronic device to at least: obtain a self-capacitance of an active electrode based on a distance between the active electrode and a grounded electrode, wherein the distance between the active electrode and the grounded electrode is based on a hinge angle between the first portion 101 and the second portion 103 with respect to the hinge element 102; and determine an opening state of the electronic device 100 based on the obtained self-capacitance.

The electronic device 100 may further comprise a display (not visible in FIGS. 1A and 1B) configured to provide a graphical user interface. The display may be a touch sensitive display. In an implementation, the electronic device 100 is a mobile device, and the display is a touch sensitive display. At least one characteristic of a graphical user interface presented on the display may be transformed based on a calculated fold angle and/or change in the fold angle between the first portion 101 and the second portion 103. In an example, the display of the electronic device 100 is a touch sensitive display and the active electrodes (at least one of the electrodes disposed in the first portion 101 and/or the second portion 103 (e.g., electrode 104, electrode 105, etc.)) of the electronic device 100 comprise capacitive sensors of the touch sensitive display.

According to an implementation, the electronic device 100 may comprise a touch or a gesture sensitive display covering at least a part of the first and second portions 101 and 103 and the hinge element 102. In another implementation, the first and second portions 101 and 103 may comprise two separate touch or gesture sensitive displays. In an example, a touch or gesture sensitive display may comprise one or more touch sensitive display panels. In another example, the electronic device 100 may comprise at least one input device. Such input devices may include keyboards, touchpads, trackpads, tracker balls, cameras, microphones etc.

In an example, the at least one memory and the computer program code are configured to, with the at least one processor, cause the electronic device to at least cause the touch sensitive display to display an interface when the determined opening state indicates that the electronic device is open, and cause the touch sensitive display to deactivate when the determined opening state indicates that the electronic device is closed.

In an example, the at least one memory and the computer program code are configured to, with the at least one processor, cause the electronic device to at least cause the touch sensitive display to transform an interface displayed on the touch sensitive display based on the determined opening state of the electronic device.

FIG. 1B illustrates the electronic device 100 in a flat position as a side view. In the flat position, the angle between the first and second portions 101 and 103 is 180 degrees or substantially 180 degrees. According to an implementation, substantially 180 degrees refers to an angle of 180 degrees±5 degrees. The hinge element 102 may comprise one or more hinges (not illustrated in FIG. 1B) which enable rotation, folding or pivoting motion. According to an implementation, the hinge element 102 may comprise a pin and a sleeve. According to an implementation, the hinge element 102 may comprise a multi-stage hinge element, so that rotation or folding occurs along multiple closely spaced parallel axes. According to an implementation, the hinge element 102 may be such that it maintains the first and second portions 101 and 103 at a fold angle set by a user. According to an implementation, the hinge element 102 may employ friction to maintain the first and second portions 101 and 103 at an angle set by the user.

FIGS. 2A-2F illustrate schematic side views of an electronic device 200 according to an implementation in various opening states and/or fold angles. The electronic device 200 comprises two portions, a first portion 201 and a second portion 203, joined to each other by a hinge element 202. The electronic device 200 further comprises a plurality of electrodes (e.g., electrode 204, electrode 205, etc.) disposed throughout the first portion 201 and the second portion 203. Additionally, each of FIGS. 2A-2F includes a bar graph representing the relative capacitances of electrodes in electronic device 200 based on the associated fold angle of the electronic device 200. The capacitance bar graph shows a capacitance pattern including the relative capacitances (e.g., mutual capacitances or self-capacitances, etc.) of five electrodes 206, 207, 208, 209, and 210 disposed in the electronic device, wherein each electrode is positioned progressively closer to the hinge element 202 from left to right. The three electrodes 206, 207, and 208 represented by the first three bars from the left may be disposed on or near the face of portion 201 and each is positioned progressively closer to the hinge element 202 from left to right. The electrode 209 represented by the bar that is second from the right may be disposed on the end of portion 201 toward the hinge. The electrode 210 represented by the bar that is farthest on the right may be positioned near the hinge element 202 and on the back surface of a portion 201 of the electronic device 200. In an alternative example, some or all of the electrodes may be disposed on the portion 203 instead of the portion 201.

The distances between the electrodes 206, 207, 208, 209, and 210 is based on the design of the electronic device 200. After calibration and/or configuration of the electronic device 200, these distances may be translated to corresponding angles of fold between the first and second portion 203 and 201. Calibration may be done during the assembly of the electronic device 200 or during the operation of the electronic device 200 to tune, learn, and/or configure a correlation between capacitances and fold angle of the electronic device 200. According to an implementation, the calibration is done during assembly; the capacitances of the electrodes when the electronic device 200 is in the flat position may be mapped to an angle of 180 degrees and the capacitances of the electrodes when the electronic device 200 is folded to the maximum may be mapped to a zero-degree fold angle. According to another implementation, calibration may be done during operation. A user of the electronic device 200 may be asked by the electronic device, via a user interface, to fold the electronic device to different degrees and corresponding relative positions may be measured by the electrodes and/or processor. The capacitances may be mapped to the angles of folding specified by the electronic device 200 to the user.

According to an implementation, the minimum possible fold angle of the electronic device 200 may be zero degrees or substantially zero degrees. According to an implementation, "substantially zero degrees" refers to an angle of 0 to 5 degrees, or to an angle of 0 to 3 degrees. According to an implementation, the electronic device 200 may be folded to a fold angle of 180 degrees, and further to a fold angle of 360 degrees.

In FIG. 2A, the electronic device 200 is in a closed position. The two portions 201 and 203 are in close proximity to each other and may be in contact at one or more points. The hinge element 202 is folded such that the fold angle between the portions 201 and 203 is substantially 0 degrees. The associated bar graph shows that the three electrodes 206, 207, and 208 on the face of the portion 201 have relatively high capacitances, reflecting that the electrodes 206, 207, and 208 are in very close proximity to the electrodes of the opposite portion 203. The end electrode 209 displays a low capacitance, reflecting that the end electrode 209 is further from other electrodes than the face electrodes. The back electrode 210 displays a very low capacitance, reflecting that the back electrode 210 is far from any other electrodes due to the closed position of the electronic device 200.

In FIG. 2B, the electronic device 200 is in an open position at substantially 30 degrees. The associated bar graph shows that the three electrodes 206, 207, and 208 on the face of the portion 201 have progressively increasing capacitances from left to right, reflecting that the electrodes are positioned progressively closer to the hinge element 202 and therefore progressively closer to electrodes on the opposite portion 203. The capacitance of the end electrode 209 has increased due to the fold angle of the hinge element 202 bringing the end of the opposite portion 203 closer to the end electrode 209. The capacitance of the back electrode 210 remains low.

In FIG. 2C, the electronic device 200 is in an open position at substantially 90 degrees. The associated bar graph shows that the two face electrodes 206 and 207 furthest from the hinge element 202 have very low capacitances due to the increased distance from the opposite portion 203. The face electrode 208 closest to the hinge element 202 and the end electrode 209 both display equally high capacitances due to being in similar proximity to the equivalent electrodes on the opposite portion 203. The capacitance of the back electrode 210 remains low.

In FIG. 2D, the electronic device 200 is in an open position at substantially 180 degrees (or a flat position, as mentioned above). The associated bar graph shows that the two face electrodes 206 and 207 furthest from the hinge element 202 have very low capacitances due to the increased distance from the opposite portion 203. The face electrode 208 closest to the hinge element 202 and back electrode 210 have similar capacitances due to be approximately equal distances from the electrodes on the opposite portion 203. The end electrode 209 displays a high capacitance due to the ends of the portions 201 and 203 being in close proximity in the flat position.

In FIG. 2E, the electronic device is in an open position at substantially 270 degrees. The associated bar graph shows that the three face electrodes 206, 207, and 208 have very low capacitance due to increased distance from the opposite portion 203. The end electrode 209 shows a medium capacitance due to the slightly increased distance between both end electrodes. The back electrode 210 shows a high capacitance due to the close proximity of the equivalent back electrode on the opposite portion 203.

In FIG. 2F, the electronic device is in an open position at substantially 360 degrees. In this position, the hinge element 202 may be at a maximum angle, such that it may include physical stops to prevent further folding. Additionally, or alternatively, the backs of the portions 201 and 203 may be in contact at one or more points. The associated bar graph shows that the three face electrodes 206, 207, and 208 have very low capacitance due to the increased distance from the opposite portion 203 because they are positioned close to the face of the portion 201, rather than the back. The end electrode 209 displays a low capacitance due to the relative distance between the ends of the portions 201 and 203 in this opening position. The back electrode 210 displays a very high capacitance due to close proximity to the equivalent back electrode on the portion 203.

FIGS. 3A and 3B illustrate schematic top and side views of an electronic device 300 featuring use of electrodes throughout the device. Referring to FIGS. 3A and 3B, the electronic device 300 comprises two portions, a first portion 301 and a second portion 303, joined to each other by a hinge element 302. The electronic device 300 further comprises a plurality of electrodes (e.g., electrode 304, electrode 305, etc.) disposed throughout the first portion 301 and the second portion 303. The electronic device 300 may use electrodes throughout both of the portions 301 and 303, as highlighted by the circled regions, when determining a fold angle based on capacitances of the electrodes. Other aspects of the implementations shown in FIGS. 3A and 3B are generally similar to those of the implementations shown in FIGS. 1A, 1B, and 2A-2F.

Figure 4B:
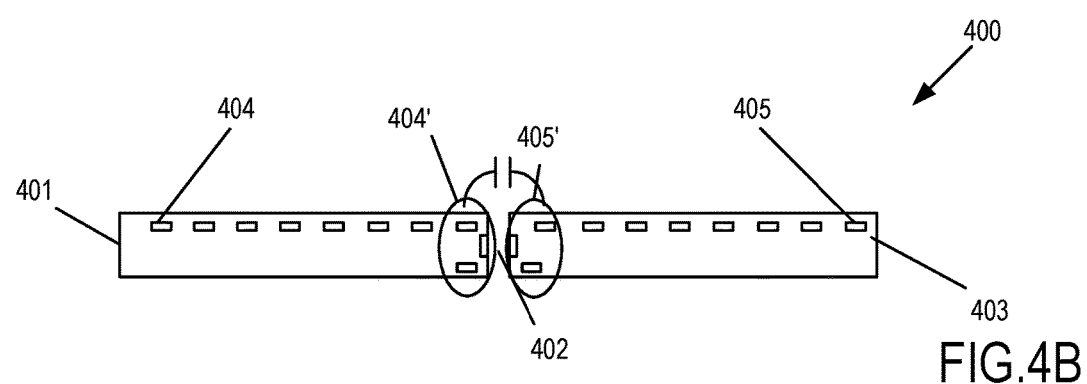

FIGS. 4A and 4B illustrate schematic top and side views of an electronic device 400 featuring use of electrodes in proximity to the hinge element 402 only. Referring to FIGS. 4A and 4B, the electronic device 400 comprises two portions, a first portion 401 and a second portion 403, joined to each other by a hinge element 402. The electronic device 400 further comprises a plurality of electrodes (e.g., electrode 404, electrode 405, etc.) disposed throughout the first portion 401 and the second portion 403. The electronic device 400 may use electrodes 404' and 405' disposed within close proximity of the hinge element 402, as highlighted by the circled regions, when determining a fold angle based on capacitances of the electrodes. The proximity of the electrodes 404' and 405' used in the fold angle calculation to the hinge element 402 may vary based on a size, shape, and/or type of the electronic device 400; a size, shape, and/or type of electrode used; a size, shape, and/or type of the portions 401 and 403; a size, shape, and/or type of the hinge element 402; etc. In an example, the electrodes 404' and 405' used to calculate the fold angle are within 5 mm distance of the hinge element 402. However, other distances are contemplated. In an example, the number of electrodes used to calculate the fold angle may be one, two, five, ten, etc. It should be understood that, while electrodes 404' and 405' in proximity to the hinge element 402 are used to calculate the fold angle, the portions 401 and 403 may further include electrodes (for instance, other electrodes 404 and 405) that are not used to calculate the fold angle (e.g., antennas, capacitive sensors in a touch sensitive display, etc.). Other portions of the implementations shown in FIGS. 4A and 4B are generally similar to those of the examples shown in FIGS. 1A, 1B, and 2A-2F.

FIGS. 5A and 5B illustrate schematic top and side views of electronic devices according to various implementations in a flat position featuring a triangular shaped antenna. For example, the triangular shaped antenna, in combination with an opposite bar antenna, may be based on a slider mechanism. By using a single active antenna, power use efficiency may be enhanced over examples with multiple active electrodes. Referring to FIGS. 5A and 5B, the electronic device 500 comprises two portions, a first portion 501 and a second portion 503, joined to each other by a hinge element 502. The electronic device 500 further comprises a plurality of electrodes (e.g., electrode 504, electrode 505, etc.) disposed throughout the first portion 501 and the second portion 503. One of the electrodes 506 of the first portion 501 comprises a triangular shaped antenna. The triangular shaped antenna 506 is disposed near the hinge element 502. It comprises a plurality of joined triangular shapes, wherein the plurality of joined triangular shapes share a base portion that runs parallel to the hinge element 502. Each of the triangular shapes includes a point portion extending from the based portion toward the hinge element 502. Triangular shapes are examples of variable width electrodes, which changes the capacitance level with respect to the overlap area.

A bar shaped electrode, or antenna, 507 is disposed in the second portion 503, opposite the triangular shaped antenna 506. The bar shaped electrode is disposed near and runs parallel to the hinge element 502. In an example, the triangular shaped antenna 506 is active (e.g., powered, etc.) and the bar shaped electrode 507 is grounded. The self-capacitance of the triangular shaped antenna 506 is measured and a fold angle of the electronic device 500 is calculated based on the measured self-capacitance. It should be understood that the self-capacitance of the triangular shaped antenna 506 may change based on the relative distance and orientation of the bar shaped electrode 507 with respect to the triangular shaped antenna 506. Changing the fold angle of the electronic device 500 around the hinge element 502 may alter the distance between the triangular shaped antenna 506 and the bar shaped antenna 507 and/or the orientation of the triangular shaped antenna 506 with respect to the bar shaped antenna 507 and the self-capacitance of the triangular shaped antenna 506 may change in response. A fold angle may thus be calculated or determined from a measured self-capacitance of the triangular shaped antenna 506.

FIG. 5B illustrates that, in an example, the triangular shaped antenna 506 and bar shaped electrode 507 may wrap around the ends of the first portion 501 and the second portion 503 respectively, which may further enhance the calculation of a fold angle based on variances in the self-capacitance of the triangular shaped antenna 506 due to the different portions of the triangular shaped antenna 506 being oriented toward the bar shaped electrode 507 at different fold angles.

Other portions of the implementations shown in FIGS. 5A and 5B are generally similar to the examples shown in FIGS. 1A, 1B, and 2A-2F.

It should further be understood that, in an example, an electronic device (e.g., electronic device 500, etc.) may include two or more triangular shaped antennas and at least one triangular shaped antenna may be disposed on each portion (e.g., portion 501 and 503, etc.). Alternatively or additionally, an electronic device may include antennas of other shapes, sizes, and/or materials arranged in other orientations such that a self-capacitance of one or more of the antennas may be used to calculate a fold angle of the electronic device.

Figures 6A, 6B:
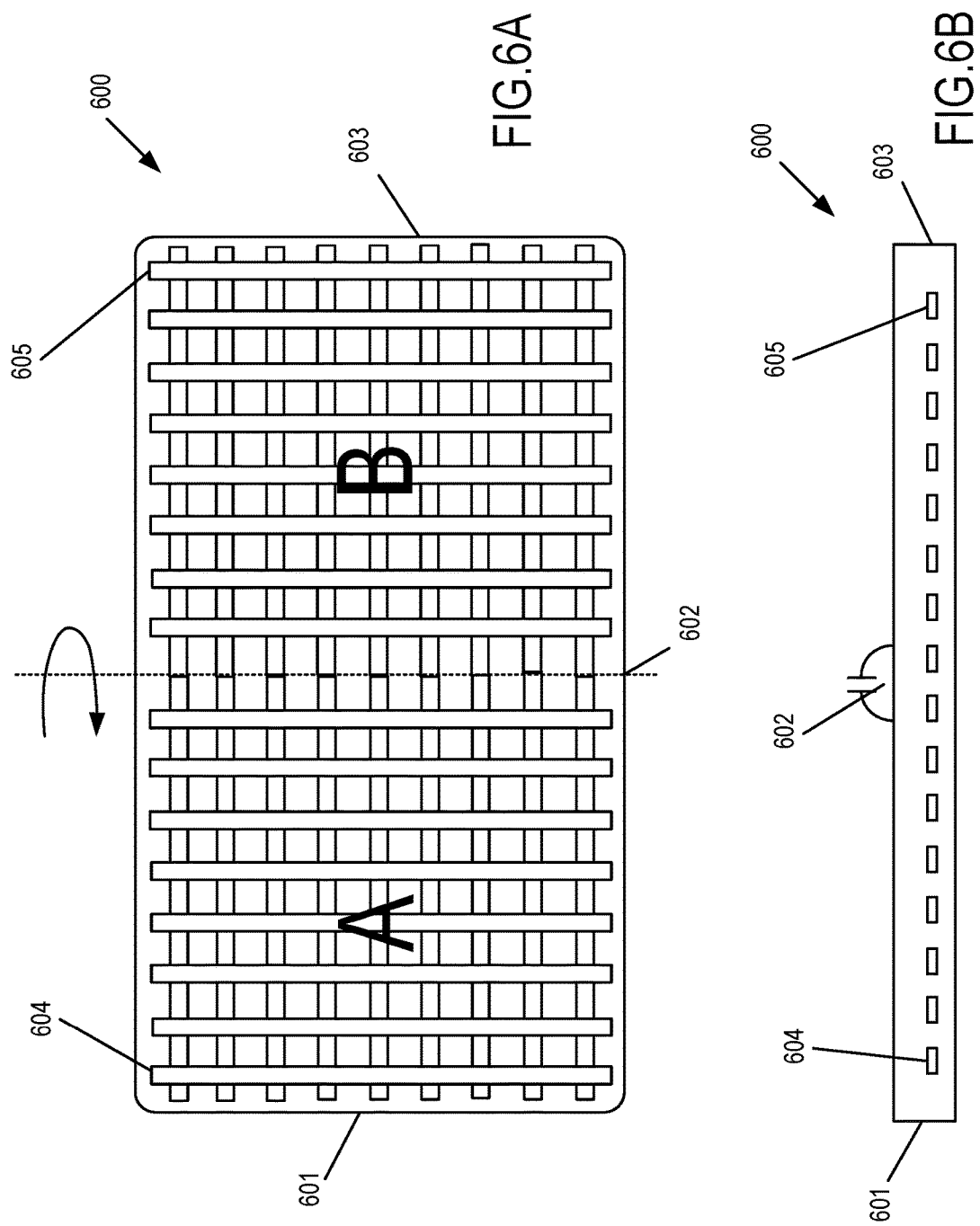
FIGS. 6A and 6B illustrate an electronic device comprising a foldable body portion in a flat position according to an implementation.

FIGS. 6A and 6B illustrate an electronic device 600 comprising a foldable body portion in a flat position according to an implementation. The electronic device 600 is generally similar to the examples shown in FIGS. 1A and 1B. The electronic device 600 comprises a foldable body portion that may be divided into a first portion 601 and a second portion 603 by folding, bending, hinging, and/or rotating, etc., around a fold axis 602. In an example, the first portion 601 and the second portion 603 are joined by a continuous surface across the fold axis 602. The foldable body portion may include a touch sensitive display that is disposed across the entire surface, including both portions 601 and 603 and across the fold axis 602. The touch sensitive display may fold along the fold axis 602 as the foldable body portion folds.

Further, the electronic device 600 comprises a plurality of electrodes (e.g., electrode 604, electrode 605, etc.) disposed in the foldable body portion. The electrodes are displayed as a network, or grid, generally similar to the electrodes of FIGS. 1A and 1B. In an example, electrodes disposed in the first portion 601 and the second portion 603 are combined and may extend from the first portion 601 to the second portion 603 across the fold axis 602.

It should be understood that, as described above with respect to electronic device 100 in FIGS. 1A and 1B, a subset of the electrodes disposed in the foldable body portion of the electronic device 600 may be active (e.g., powered, etc.) and/or a subset of the electrodes disposed in the foldable body portion of the electronic device 600 may be grounded. The electrodes may be used to calculate a fold angle between the first portion 601 and the second portion 603 around the fold axis 602. Mutual capacitances between electrodes on opposite sides of the fold axis 602 and/or self-capacitances of active electrodes with respect to grounded electrodes on the opposite side of the fold axis 602 may be used to calculate the fold angle at the fold axis.

The electronic device 600 may further comprise a computing apparatus, such as at least one processor and at least one memory comprising computer program code, the computing apparatus being configured to calculate a fold angle of the electronic device 100 as described below.

In an example, the at least one memory and the computer program code are configured to, with the at least one processor, cause the electronic device to at least: obtain a self-capacitance of at least one powered electrode based on a distance between the at least one powered electrode and at least one grounded electrode; and calculate a fold angle of a fold in the foldable body portion based on the obtained self-capacitance, wherein a fold axis of the fold is disposed between the at least one powered electrode and the at least one grounded electrode.

In an example, the at least one powered electrode includes a plurality of powered electrodes and the at least one memory and the computer program code are configured to, with the at least one processor, cause the electronic device to at least: obtain a self-capacitance value for each powered electrode of the plurality of powered electrodes based on a distance between each powered electrode of the plurality of powered electrodes and the at least one grounded electrode; and calculate a fold angle of a fold in the foldable body portion based on the obtained self-capacitance, wherein a fold axis of the fold is disposed between the at least one powered electrode and the at least one grounded electrode.

In an example, the at least one memory stores a plurality of predefined self-capacitance patterns and plurality of redefined fold angle values, wherein each predefined self-capacitance pattern of the plurality of predefined self-capacitance patterns is associated with a predefined fold angle value of the predefined plurality of fold angle values. The at least one memory and the computer program code are configured to, with the at least one processor, cause the electronic device to at least: match obtained self-capacitance values of the plurality of powered electrodes to one predefined self-capacitance pattern of the plurality of predefined self-capacitance patterns; and assign the predefined fold angle value associated with the matching self-capacitance pattern to the fold angle along the fold axis of the foldable body portion.

In an example, the at least one memory and the computer program code are configured to, with the at least one processor, cause the electronic device to at least: cause a touch sensitive display to display a first interface when the calculated fold angle is greater than 175 degrees and less than 185 degrees; and cause the touch sensitive display to display a second interface on a first portion of the touch sensitive display disposed on a first side of the fold axis and a third interface on a second portion of the touch sensitive display disposed on a second side of the fold axis when the calculated fold angle is less than 175 degrees and when the calculated fold angle is greater than 185 degrees.

In an example, the at least one memory and the computer program code are configured to, with the at least one processor, cause the electronic device to at least: cause a touch sensitive display to activate when the calculated fold angle is greater than 10 degrees; and cause the touch sensitive display to deactivate when the calculated fold angle is less than or equal to 10 degrees.

Other portions of the implementations shown in FIGS. 6A and 6B are generally similar to the implementations shown in FIGS. 1A, 1B, and 2A-2F.

FIGS. 7A-7F illustrate schematic side views of an electronic device 700 comprising a foldable body portion according to an implementation in various open states and/or fold angles. The electronic device 700 comprises a foldable body portion divided into two portions, a first portion 701 and a second portion 703, by a fold axis 702. The electronic device 700 further comprises a plurality of electrodes (e.g., electrode 704, electrode 705, etc.) disposed throughout the foldable body portion. Additionally, each of FIGS. 7A-7F includes a bar graph representing the relative capacitances of electrodes 706, 707, 708, 709, and 710 in electronic device 700 based on the associated fold angle of the electronic device 700. The capacitance bar graph shows the relative capacitances of five electrodes 706, 707, 708, 709, and 710 disposed in the electronic device, wherein each electrode is positioned progressively closer to the fold axis 702 from left to right. The three electrodes 706, 707, and 708 represented by the first three bars from the left may be disposed on or near the face of portion 701 and each is positioned progressively closer to the fold axis 702 from left to right. The electrode 709 represented by the bar that is second from the right may be disposed in the portion 701 adjacent to the fold axis 702. The electrode 710 represented by the bar that is farthest on the right may be positioned near the back surface of a portion 701 of the electronic device 700. In an alternative example, some or all of the electrodes 706, 707, 708, 709, and 710 may be disposed on the portion 703 instead of the portion 701.

Figure 7B:
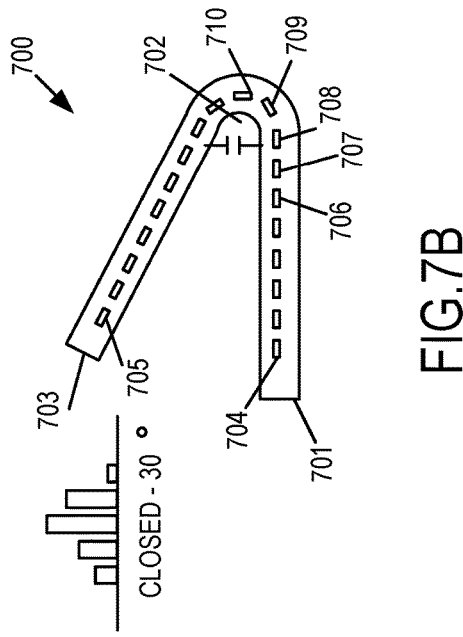
Figure 7C:
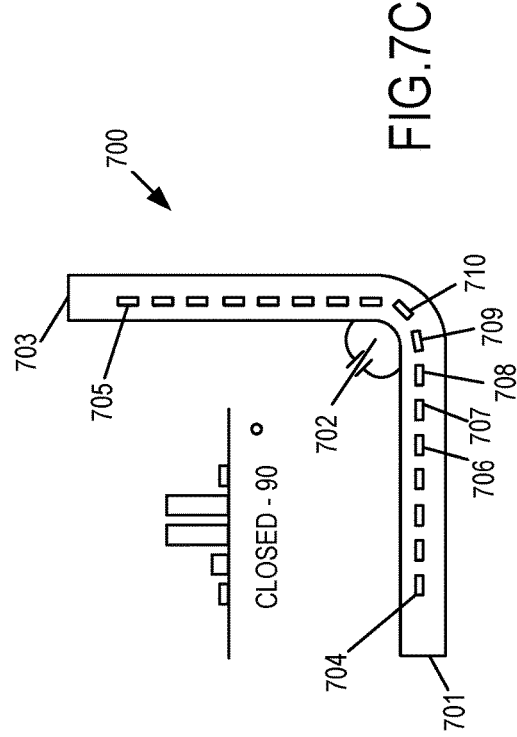
Figure 7A:
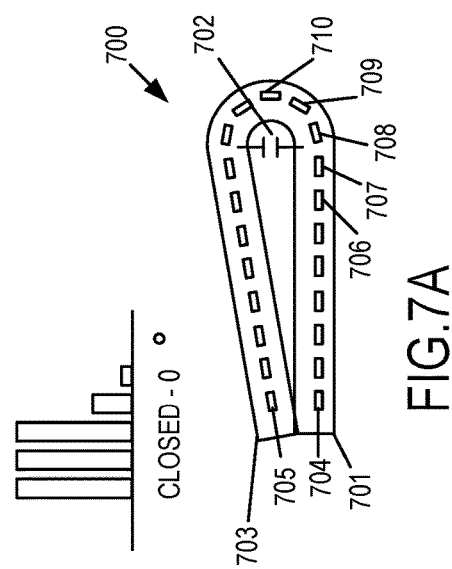

In FIG. 7A, the electronic device 700 is in a closed position. The two portions 701 and 703 are in close proximity to each other and may be in contact at one or more points. The fold angle of the fold axis 702 is folded such that the fold angle between the portions 701 and 703 is substantially 0 degrees. The associated bar graph shows that the three electrodes 706, 707, and 708 on the face of the portion 701 have relatively high capacitances, reflecting that the electrodes 706, 707, and 708 are in very close proximity to the electrodes of the opposite portion 703. The fold-adjacent electrode 709 displays a low capacitance, reflecting that the fold-adjacent electrode 709 is further from other electrodes than the face electrodes. The back electrode 710 displays a very low capacitance, reflecting that the back electrode is far from any other electrodes due to the closed position of the electronic device 700.

In FIG. 7B, the electronic device 700 is in an open position at substantially 30 degrees. The associated bar graph shows that the three electrodes 706, 707, and 708 on the face of the portion 701 have progressively increasing capacitances from left to right, reflecting that the electrodes 706, 707, and 708 are positioned progressively closer to the fold axis 702 and therefore progressively closer to electrodes on the opposite portion 703. The capacitance of the fold-adjacent electrode 709 has increased due to the fold angle of the fold axis 702 bringing the equivalent electrode of the opposite portion 703 closer to the fold-adjacent electrode 709. The capacitance of the back electrode 710 remains low.

In FIG. 7C, the electronic device 700 is in an open position at substantially 90 degrees. The associated bar graph shows that the two face electrodes 706 and 707 further from the fold axis 702 have very low capacitances due to the increased distance from the opposite portion 703. The face electrode 708 closest to the fold axis 702 and the fold-adjacent electrode 709 both display equally high capacitances due to being in similar proximity to the equivalent electrodes on the opposite portion 703. The capacitance of the back electrode 710 remains low.

In FIG. 7D, the electronic device 700 is in an open position at substantially 180 degrees (or a flat position, as mentioned above). The associated bar graph shows that the two face electrodes 706 and 707 furthest from the fold axis 702 have very low capacitances due to the increased distance from the opposite portion 703. The face electrode 708 closest to the fold axis 702 and back electrode 710 have similar capacitances due to be approximately equal distances from the electrodes on the opposite portion 703. The fold-adjacent electrode 709 displays a high capacitance due to close proximity to the equivalent electrode of the portion 703 in the flat position.

In FIG. 7E, the electronic device is in an open position at substantially 270 degrees. The associated bar graph shows that the three face electrodes 706, 707, and 708 have very low capacitance due to increased distance from the opposite portion 703. The fold-adjacent electrode 709 shows a medium capacitance due to the slightly increased distance between both fold-adjacent electrodes. The back electrode 710 shows a high capacitance due to the close proximity of the equivalent back electrode on the opposite portion 703.

In FIG. 7F, the electronic device is in an open position at substantially 360 degrees. In this position, the fold axis 702 may be at a maximum angle, such that it may include physical stops to prevent further folding. Additionally, or alternatively, the backs of the portions 701 and 703 may be in contact at one or more points. The associated bar graph shows that the three face electrodes 706, 707, and 708 have very low capacitance due to the increased distance from the opposite portion 703 because they are positioned close to the face of the portion 701, rather than the back. The fold-adjacent electrode 709 displays a low capacitance due to the relative distance to the equivalent fold-adjacent electrode of the portion 703 in this opening position. The back electrode 710 displays a very high capacitance due to close proximity to the equivalent back electrode on the portion 703.

Other portions of the implementations shown in FIGS. 7A-7F are generally similar to the examples shown in FIGS. 1A, 1B, and 2A-2F.

Figure 8A:
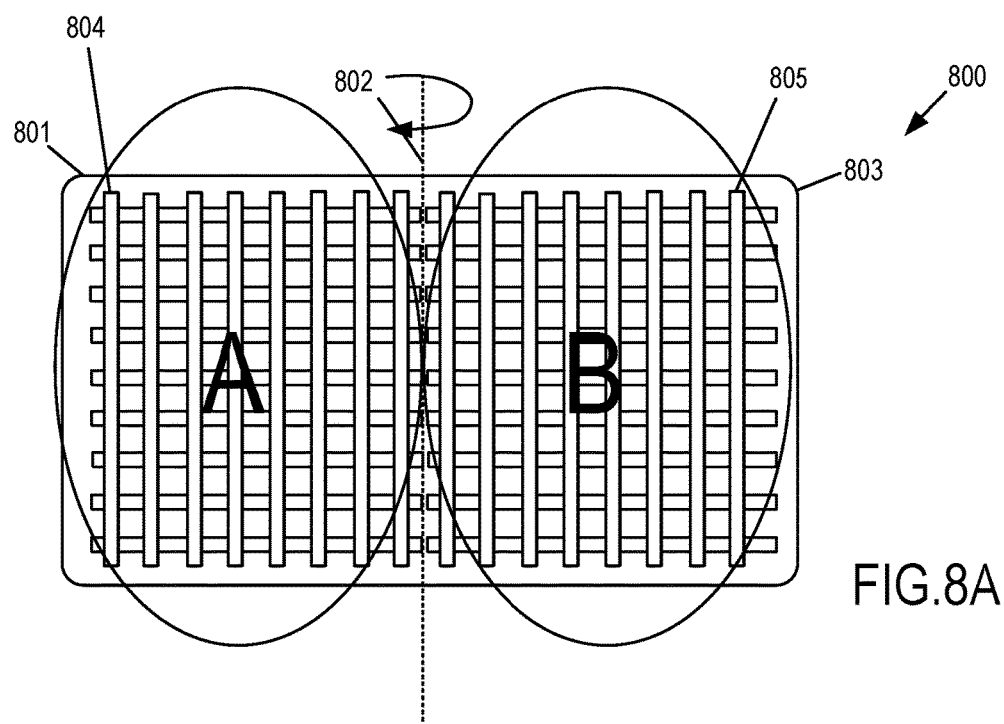
FIGS. 8A and 8B illustrate schematic top and side views of an electronic device comprising a foldable body portion featuring use of electrodes throughout the device.
Figure 8B:
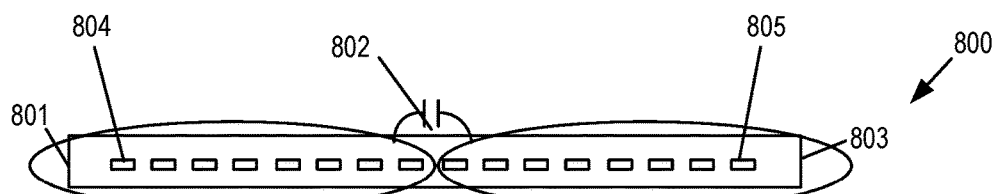

FIGS. 8A and 8B illustrate schematic top and side views of an electronic device 800 comprising a foldable body portion featuring use of electrodes throughout the device. The electronic device 800 comprises a foldable body portion divided into two portions, a first portion 801 and a second portion 803, by a fold axis 802. The electronic device 800 further comprises a plurality of electrodes (e.g., electrode 804, electrode 805, etc.) disposed throughout the first portion 801 and the second portion 803. The electronic device 800 may use electrodes throughout both of the portions 801 and 803, as highlighted by the circled regions, when determining a fold angle based on capacitances of the electrodes. Other portions of the implementations shown in FIGS. 8A and 8B are generally similar to the examples shown in FIGS. 3A-3B and 6A-6B.

Figure 9A:
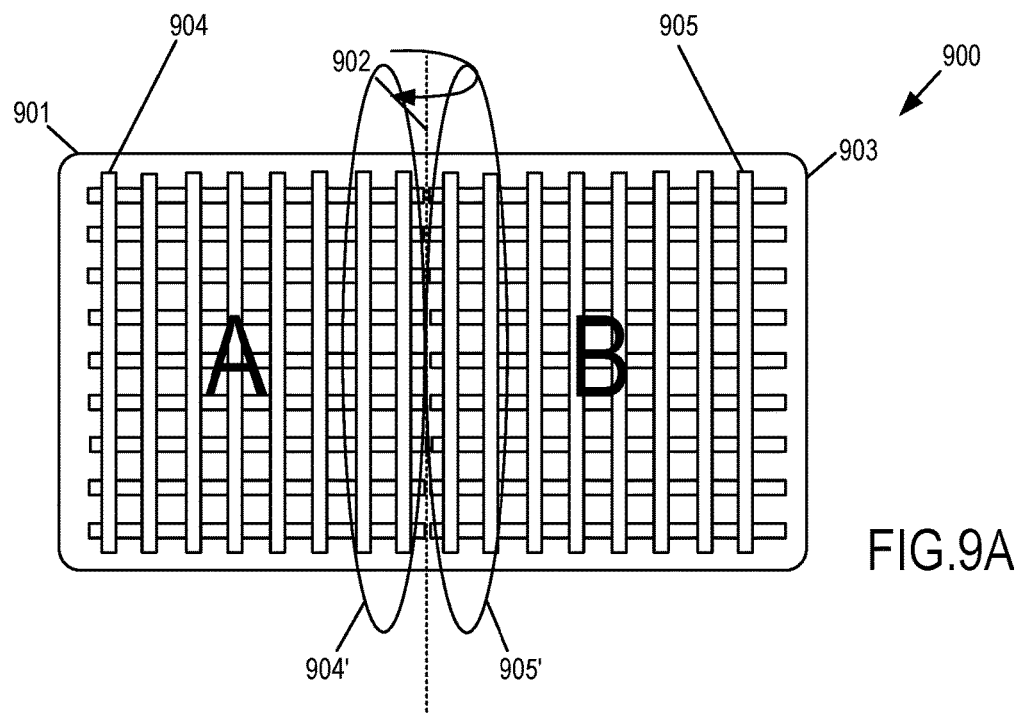
FIGS. 9A and 9B illustrate schematic top and side views of an electronic device comprising a foldable body portion featuring use of electrodes in proximity to the fold only.
Figure 9B:
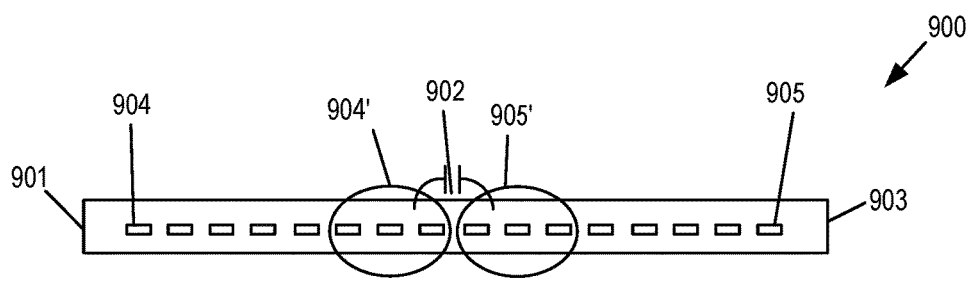

FIGS. 9A and 9B illustrate schematic top and side views of an electronic device 900 comprising a foldable body portion featuring use of electrodes in proximity to the fold only. The electronic device 900 comprises a foldable body portion divided into two portions, a first portion 901 and a second portion 903, by a fold axis 902. The electronic device 900 further comprises a plurality of electrodes (e.g., electrode 904, electrode 905, etc.) disposed throughout the first portion 901 and the second portion 903. The electronic device 900 may use electrodes 904' and 905' disposed within a close proximity of the fold axis 902, as highlighted by the circled regions, when determining a fold angle based on capacitances of the electrodes. The proximity of the electrodes 904' and 905' used in the fold angle calculation to the fold axis 902 may vary based on a size, shape, and/or type of the electronic device 900; a size, shape, and/or type of electrode used; a size, shape, and/or type of the portions 901 and 903; a size, shape, and/or type of the fold axis 902; etc. In an example, the electrodes 904' and 905' used to calculate the fold angle are within substantially 5 mm distance of the fold axis 902. However, other distances are contemplated. In an example, the number of electrodes used to calculate the fold angle may be one, two, five, ten, etc. It should be understood that, while electrodes 904' and 905' in proximity to the fold axis 902 are used to calculate the fold angle, the portions 901 and 903 may further include electrodes that are not used to calculate the fold angle (e.g., stand-alone antennas, capacitive sensors in a touch sensitive display, etc.). Other aspects of the implementations shown in FIGS. 9A and 9B are generally similar to the examples shown in FIGS. 4A-4B and 6A-6B.

Figure 10:
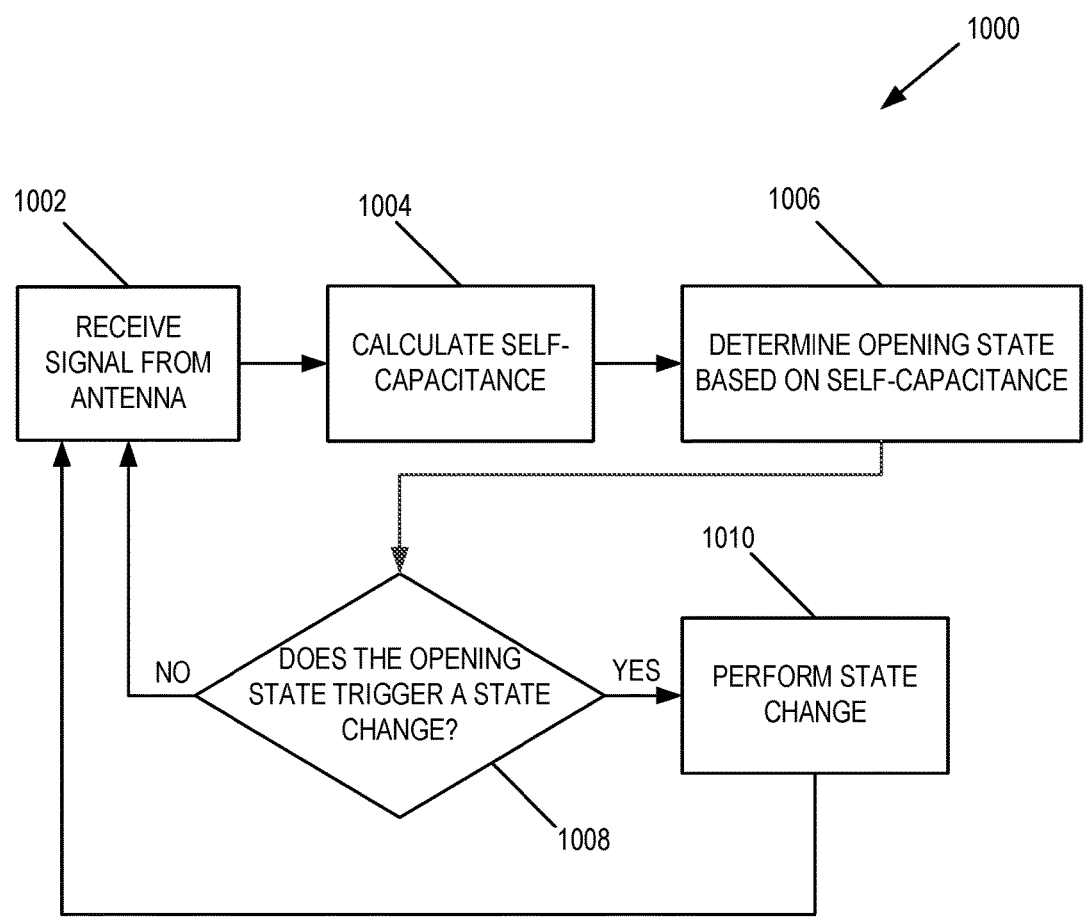
FIG. 10 illustrates a flowchart describing a method of determining an opening state of an electronic device.

FIG. 10 illustrates a flowchart describing a method 1000 of determining an opening state of an electronic device. The method 1000 comprises receiving, by a processor, at least one signal from at least one electrode disposed in a foldable electronic device at 1002. The at least one electrode may be one or more of the electrodes described in the implementations above. The signal may comprise an electrical signal from the at least one electrode when the at least one electrode is active (e.g., powered, etc.). In an example, the at least one electrode may comprise a plurality of electrodes and the at least one signal may comprise a signal from each of the plurality of electrodes. The foldable electronic device may be an electronic device according to the implementations above. The processor may be disposed within the foldable electronic device as described in the illustrative implementations above. Alternatively, the processor may be disposed outside of the foldable electronic device and it may receive the at least one signal over a network connection.

At 1004, a self-capacitance of the at least one electrode is calculated, by the processor, based on the received signal. It should be understood by a person of ordinary skill in the art that a self-capacitance may be calculated for an electrode in a conventional manner. In an example, the at least one electrode may comprise a plurality of electrodes and the self-capacitance of the at least one electrode may comprise a self-capacitance value for each electrode of the plurality of electrodes.

At 1006, an opening state is determined, by the processor, based on the calculated self-capacitance of the at least one electrode. In an example, the at least one electrode comprises one electrode. The self-capacitance of the one electrode may vary based on the opening state of the electronic device. The processor may be configured to associate, or map, a set of self-capacitance values of the one electrode to a set of opening states of the electronic device. When a particular self-capacitance value of the one electrode is calculated, the processor may determine the opening state of the electronic device by referring to the configured map of associations between the self-capacitance values and opening states of the electronic device.

In an alternative example, the processor may be configured to use a defined formula for calculating the opening state of the electronic device. The defined formula may take the self-capacitance value of the one electrode as input and provide a value associated with an opening state of the electronic device as an output.

In an example, the at least one electrode comprises a plurality of electrodes (e.g., 2 electrodes, 5 electrodes, 10 electrodes, etc.). Each of the plurality of electrodes may provide a signal such that a self-capacitance value is calculated for each of the plurality of electrodes. The plurality of self-capacitance values may be considered as a self-capacitance pattern (e.g., the set of capacitance values represented in the bar graphs of FIGS. 2A-2F, 7A-7F, etc.) for determining the opening state of the electronic device. For instance, the processor may be configured to associate, or map, a set of self-capacitance patterns of the plurality of electrodes to a set of opening states of the electronic device. When a self-capacitance pattern is calculated, the processor may determine the opening state of the electronic device by referring to the configured map of associations between the self-capacitance patterns and opening states of the electronic device.

In an alternative example, the processor may be configured to use a defined formula for calculating the opening state of the electronic device. The defined formula may take the self-capacitance pattern of the pluralities of electrodes as input and provide a value associated with an opening state of the electronic device as an output.

At 1008, the processor determines whether the opening state triggers a state change. In an example, a particular opening state may trigger a state change. For instance, when the opening state of an electronic device indicates that the electronic device is closed, a state change may be triggered that causes the electronic device to enter a power down state, a sleep state, or a suspend state, etc. Alternatively, when the opening state of an electronic device indicates that the electronic device is open, a state change may be triggered that causes the electronic device to enter a powered state, an awake state, or an active state, etc.

In an example, a state change may be triggered when the determined opening state is different than a previous opening state. For instance, when the previous opening state was closed and the current determined opening state is open, the state change to activate the electronic device may be triggered. Alternatively, when the previous opening state was closed and the current determined opening state is closed, no state change may be triggered.

In an example, a state change may be triggered when an opening state falls within a range of opening states. For instance, a state change to transform display interface to display multiple interfaces may be triggered when the determined opening state indicates that the electronic device has a fold angle between 10 degrees and 170 degrees. Alternatively, or additionally, a state change to display a single interface may be triggered when the opening state indicates that the electronic device has a fold angle between 170 degrees and 180 degrees. Alternatively, or additionally, a state change to deactivate a display may be triggered when the opening state indicates that the electronic device has a fold angle between 0 degrees and 10 degrees.

In an example, a state change may be triggered when a defined rate of change of the opening state is detected that falls within a defined range of possible rates of change of the opening state of the electronic device. For instance, when a fast rate of change (e.g., greater than 60 degrees per second) is detected based on the determined opening state compared to at least one previously determined opening state, a state change may be triggered that causes a "quick shut down" sequence (e.g., suspend the device rather than perform a full shutdown of the device) or a "quick power up" sequence (e.g., power on into a diagnostic or safe mode rather than a normal boot up mode). Alternatively, or additionally, when a slow rate of change (e.g., less than 60 degrees per second) is detected based on the determined opening state compared to at least one previously determine opening state, a state change may be triggered that causes a normal shut down sequence or a normal boot up sequence.

If a state change is not triggered at 1008, the processor returns to receiving at least one signal at 1002.

If a state change is triggered at 1008, the triggered state change is performed by the processor at 1010. The triggered state change may comprise one or more of the example state changes described above. It should be understood that the state changes described above are illustrative, not exclusive, and that other state changes may be triggered and/or performed in alternative examples of the method 1000.

Figure 11:
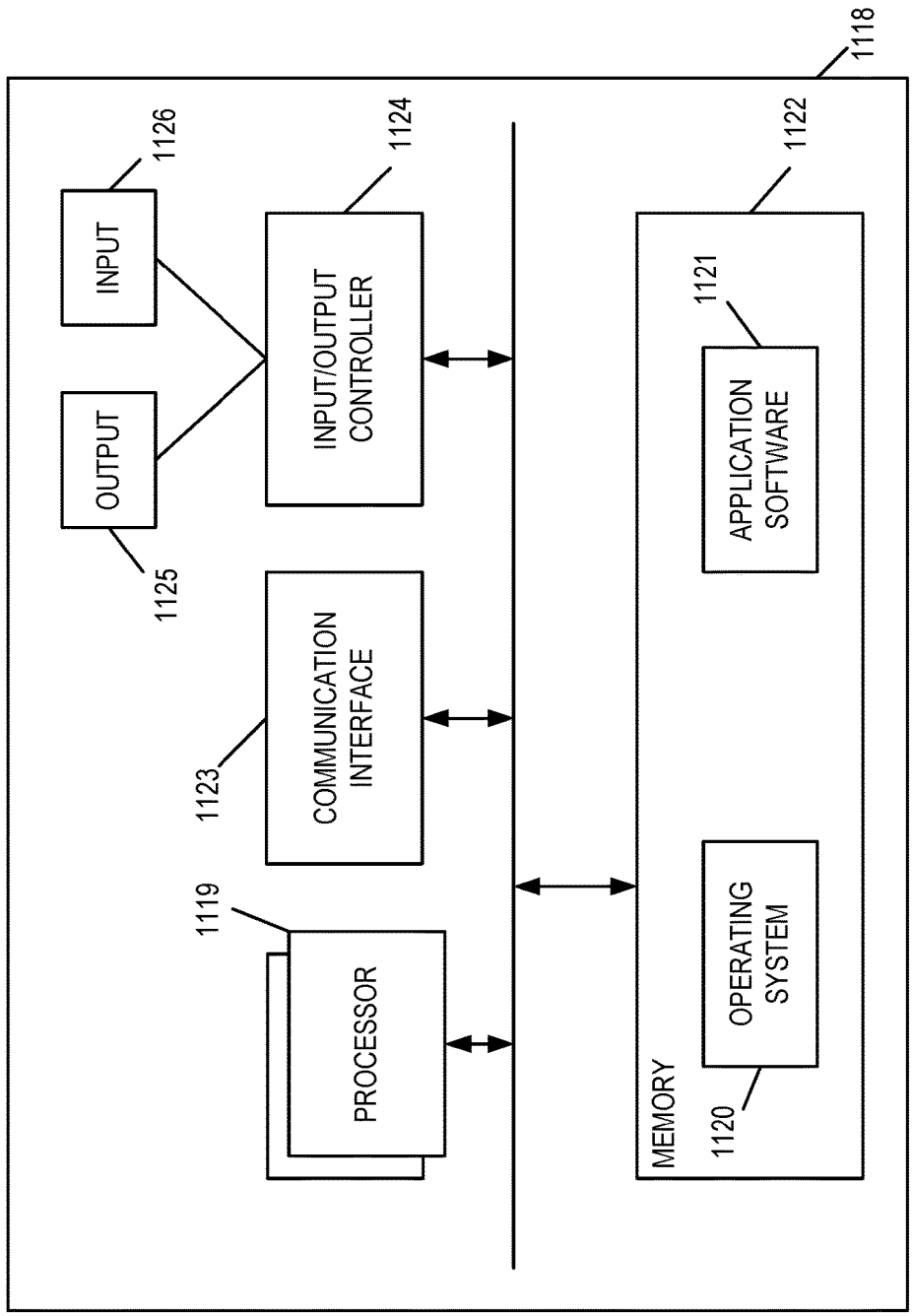
FIG. 11 illustrates a computing apparatus according to an implementation as a functional block diagram.

FIG. 11 illustrates a computing apparatus 1118 according to an implementation as a functional block diagram. In an implementation, components of a computing apparatus 1118 may be implemented as a part of an electronic device according to one or more implementations described in this specification. The computing apparatus 1118 comprises one or more processors 1119 which may be microprocessors, controllers or any other suitable type of processors for processing computer executable instructions to control the operation of the electronic device. Platform software comprising an operating system 1120 or any other suitable platform software may be provided on the apparatus 1118 to enable application software 1121 to be executed on the device. According to an implementation, the calculation of fold angle and/or opening state of the electronic device may be accomplished by software. Furthermore, it may receive information from the electrodes (e.g., stand-alone antennas, capacitive sensors, etc.) regarding capacitance. Consequently, it may convert this information into the fold angle. In implementations in which the electronic device comprises a touch sensitive display or other type of display configured to provide a graphical user interface, the computing apparatus 1118 may be configured to transform at least one characteristic of the graphical user interface presented on the display based on the fold angle/opening state and/or a change in the fold angle/opening state of the electronic device.

Computer executable instructions may be provided using any computer-readable media that are accessible by the computing apparatus 1118. Computer-readable media may include, for example, computer storage media such as a memory 1122 and communications media. Computer storage media, such as a memory 1122, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1122) is shown within the computing apparatus 1118, it will be appreciated by a person skilled in the art, that the storage may be distributed or located remotely and accessed via a network or other communication link (e.g. using a communication interface 1123).

The computing apparatus 1118 may comprise an input/output controller 1124 configured to output information to one or more output devices 1125, for example a display or a speaker, which may be separate from or integral to the electronic device. The input/output controller 1124 may also be configured to receive and process an input from one or more input devices 1126, for example, a keyboard, a microphone or a touchpad. In one implementation, the output device 1125 may also act as the input device. An example of such a device may be a touch sensitive display. The input/output controller 1124 may also output data to devices other than the output device, e.g. a locally connected printing device.

The functionality described herein can be performed, at least in part, by one or more hardware logic components. According to an implementation, the computing apparatus 1118 is configured by the program code when executed by the processor 1119 to execute the implementations of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present implementations may be described and illustrated as being implemented in a smartphone, a mobile phone, or a tablet computer, these are only examples of a device and not a limitation. As those skilled in the art will appreciate, the present implementations are suitable for application in a variety of different types of devices, such as portable and mobile devices, for example, in laptop computers, tablet computers, game consoles or game controllers, various wearable devices, etc.

Alternatively, or in addition to the other examples described herein, examples include any combination of the following:

An electronic device comprising:
a first portion;
a second portion;
a hinge element disposed between the first portion and the second portion so that the first portion is rotatable with respect to the second portion;
an active electrode disposed on the first portion;
a grounded electrode disposed on the second portion;
at least one processor; and
at least one memory comprising computer program code, the at least one memory and the computer program code configured to, with the at least one processor, cause the electronic device to at least:
obtain a self-capacitance of the active electrode based on a distance between the active electrode and the grounded electrode, wherein the distance between the active electrode and the grounded electrode is based on a hinge angle between the first portion and the second portion with respect to the hinge element; and
determine an opening state of the electronic device based on the obtained self-capacitance.

The electronic device described above wherein the active electrode and the grounded electrode are disposed within a proximity of the hinge element.

The electronic device described above wherein the proximity is substantially within 5 mm distance of the hinge element.

The electronic device described above wherein the active electrode comprises a triangular shaped antenna.

The electronic device described above wherein the triangular shaped antenna comprises a plurality of joined triangular shapes, wherein the plurality of triangular shapes shares a base portion that runs parallel to the hinge element and each triangular shape of the plurality of triangular shapes includes a point extending from the base portion toward the hinge element.

The electronic device described above wherein the grounded electrode comprises a bar shaped antenna.

The electronic device described above wherein the first portion includes a touch sensitive display.

The electronic device described above wherein the active electrode is a capacitive sensor of the touch sensitive display.

The electronic device described above wherein the at least one memory and the computer program code are configured to, with the at least one processor, cause the electronic device to further:

cause the touch sensitive display to display an interface when the determined opening state indicates that the electronic device is open; and cause the touch sensitive display to deactivate when the determined opening state indicates that the electronic device is closed.

The electronic device described above wherein the at least one memory and the computer program code are configured to, with the at least one processor, cause the electronic device to further:

cause the touch sensitive display to transform an interface displayed on the touch sensitive display based on the determined opening state of the electronic device.

An electronic device comprising:
a foldable body portion;
at least one powered electrode disposed in the foldable body portion;
at least one grounded electrode disposed in the foldable body portion;
at least one processor; and
at least one memory comprising computer program code, the at least one memory and the computer program code configured to, with the at least one processor, cause the electronic device to at least:
obtain a self-capacitance of the at least one powered electrode based on a distance between the at least one powered electrode and the at least one grounded electrode; and
calculate a fold angle of a fold in the foldable body portion based on the obtained self-capacitance, wherein a fold axis of the fold is disposed between the at least one powered electrode and the at least one grounded electrode.

The electronic device described above wherein the at least one powered electrode includes a plurality of powered electrodes; and obtaining a self-capacitance of the at least one powered electrode includes obtaining a self-capacitance value for each powered electrode of the plurality of powered electrodes based on a distance between each powered electrode of the plurality of powered electrodes and the at least one grounded electrode.

The electronic device described above wherein the plurality of powered electrodes are disposed within a proximity of 5 mm distance of the fold axis.

The electronic device described above wherein the at least one memory stores a plurality of predefined self-capacitance patterns and a plurality of predefined fold angle values;

wherein each predefined self-capacitance pattern of the plurality of predefined self-capacitance patterns is associated with a predefined fold angle value of the predefined plurality of fold angle values; and wherein calculating a fold angle along a fold axis of the foldable body portion includes:

matching the obtained self-capacitance values of the plurality of powered electrodes to one predefined self-capacitance pattern of the plurality of predefined self-capacitance patterns; and assigning a predefined fold angle value associated with the matching self-capacitance pattern to the fold angle along the fold axis of the foldable body portion.

The electronic device described above wherein the foldable body portion includes a touch sensitive display.

The electronic device described above wherein the fold axis of the foldable body portion is disposed through the touch sensitive display such that the touch sensitive display folds along the fold axis; and wherein the at least one memory and the computer program code configured to, with the at least one processor, cause the electronic device to further:

cause the touch sensitive display to display a first interface when the calculated fold angle is greater than 175 degrees and less than 185 degrees; and cause the touch sensitive display to display a second interface on a first portion of the touch sensitive display disposed on a first side of the fold axis and a third interface on a second portion of the touch sensitive display disposed on a second side of the fold axis when the calculated fold angle is less than 175 degrees and when the calculated fold angle is greater than 185 degrees.

The electronic device described above wherein the at least one memory and the computer program code configured to, with the at least one processor, cause the electronic device to further:

cause the touch sensitive display to activate when the calculated fold angle is greater than 10 degrees; and cause the touch sensitive display to deactivate when the calculated fold angle is less than or equal to 10 degrees.

A method comprising:
receiving, by a processor, at least one signal from at least one electrode disposed in a foldable electronic device;
calculating, by the processor, a self-capacitance value of the at least one electrode based on the at least one signal; and
determining, by the processor, an opening state of the foldable electronic device based on the self-capacitance value.

The method described above further comprising causing, by the processor, the foldable electronic device to enter at least one of a power down state, a sleep state, and a suspend state when the determined opening state indicates that the foldable electronic device is closed.

The method described above further comprising causing, by the processor, a display disposed on the foldable electronic device to transform a displayed interface based on the determined opening state of the foldable electronic device.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The implementations illustrated and described herein as well as implementations not specifically described herein but within the scope of aspects of the claims constitute illustrative means for hinging a first and a second portion of an electronic device. Hinge elements 102, 202, 302, 402 and 502 illustrate hinging means for hinging the first and second portions relative to each other. The foldable body portions are illustrative folding means for folding the electronic device along a fold axis to form the first and second portions. The illustrated electrodes 104, 105, 204, 205, 206, 207, 208, 209, 210, 304, 305, 404, 405, 404', 405', 504, 505, 506, 507, 604, 605, 704, 705, 706, 707, 708, 709, 710, 804, 805, 904, 905, 904', 905' constitute examples of sensing means for sensing capacitance. The illustrated one or more processors 1119 together with the computer program code stored in memory 1122 constitute examples of calculation means for calculating a fold angle and/or opening state of the electronic device based on the capacitance of the electrodes as detected by the sensing means.

The term "comprising" is used in this specification to mean including the feature(s) or act(s) followed thereafter, without excluding the presence of one or more additional features or acts.

The invention claimed is:

1. An electronic device comprising:
a first portion;
a second portion;
a fold axis, wherein the first portion is foldable with respect to the second portion at the fold axis;
a plurality of active electrodes disposed in positions on the first portion;
one or more grounded electrodes disposed on the second portion;
at least one processor; and
at least one memory comprising computer program code, the at least one memory and the computer program code configured to cause the processor to at least:
obtain a first self-capacitance value of a first active electrode, of the plurality of active electrodes, the first self-capacitance value based on a first distance between the first active electrode and the one or more grounded electrodes,
obtain an $n^{th}$ self-capacitance value of an $n^{th}$ active electrode, of the plurality of active electrodes, based on an $n^{th}$ distance between the $n^{th}$ active electrode and the one or more grounded electrodes, the first self-capacitive value being different from the $n^{th}$ self-capacitance value,
calculate a self-capacitance pattern of the plurality of active electrodes based at least on:
a first position of the first active electrode on the first portion as biased by the first self-capacitance value, and
an $n^{th}$ position of the $n^{th}$ active electrode as biased by the $n^{th}$ self-capacitance value, and
based at least on the calculated self-capacitance pattern, determine a fold angle of the fold axis.

2. The electronic device of claim 1, wherein the first portion includes a touch sensitive display.

3. The electronic device of claim 1, wherein the at least one memory and the computer program code are configured to, with the at least one processor, cause the electronic device to further:
cause a touch sensitive display, of the electronic device, to transform an interface displayed on the touch sensitive display based on a determined opening state of the electronic device.

4. The electronic device of claim 1, wherein the computer program code is further configured to cause the processor to at least:
based at least on the calculated self-capacitance pattern, ascertain an opening state of the electronic device.

5. The electronic device of claim 1, wherein the computer program code is further configured to cause the at least one processor at least to:
map the calculated self-capacitance pattern to corresponding angles of fold between the first portion and the second portion.

6. The electronic device of claim 5, wherein the computer program code is further configured to cause the at least one processor at least to:
determine the corresponding angles of fold between the first portion and the second portion based at least on distances between the plurality of active electrodes.

7. The electronic device of claim 1, wherein at least one fold axis is located at one of:
a hinge portion of the electronic device;
a rollable portion of the electronic device;
a flexible portion of the electronic device;
a bendable portion of the electronic device; and
a foldable portion of the electronic device.

8. An electronic device comprising:
a foldable body having a first portion and a second portion that is foldable about a fold axis with respect to the first portion;
a plurality of driver electrodes disposed in positions on the first portion;
a plurality of receiver electrodes disposed on the second portion;
at least one processor; and
at least one memory comprising computer program code, the at least one memory and the computer program code configured to cause the processor to at least:
obtain first capacitance value of a first active electrode, of a plurality of active electrodes, the first capacitance value based on a first distance between the first active electrode and one or more grounded electrodes,
obtain an $n^{th}$ capacitance value of an $n^{th}$ active electrode, of the plurality of active electrodes, based on an $n^{th}$ distance between the $n^{th}$ active electrode and the one or more grounded electrodes, the first capacitance value being different from the $n^{th}$ capacitance value,
calculate a capacitance pattern of the plurality of active electrodes based at least on:
a first position of the first active electrode on the first portion as biased by the first capacitance value, and
an $n^{th}$ position of the $n^{th}$ active electrode as biased by the $n^{th}$ capacitance value, and
based at least on the calculated capacitance pattern, determine a fold angle of the fold axis.

9. The electronic device of claim 8, wherein the computer program code is further configured to cause the processor to at least:
based at least one calculated self-capacitance pattern, ascertain an opening state of the electronic device.

10. The electronic device of claim 8, wherein the computer program code is further configured to cause the at least one processor at least to:
    map a calculated self-capacitance pattern to corresponding angles of fold between the first portion and the second portion.

11. The electronic device of claim 10, wherein the computer program code is further configured to cause the at least one processor at least to:
    determine the corresponding angles of fold between the first portion and the second portion based at least on distances between the plurality of active electrodes.

12. The electronic device of claim 8, wherein at least one fold axis is located at one of:
    a hinge portion of the electronic device;
    a rollable portion of the electronic device;
    a flexible portion of the electronic device;
    a bendable portion of the electronic device; and
    a foldable portion of the electronic device.

13. A method comprising:
    obtaining a first self-capacitance value of a first active electrode, of a plurality of active electrodes, the first self-capacitance value based on a first distance between the first active electrode and one or more grounded electrodes, wherein the plurality of active electrodes are disposed in positions on a first portion of a foldable electronic device, and wherein the one or more grounded electrodes are disposed on a second portion of the a foldable electronic device;
    obtaining an $n^{th}$ self-capacitance value of an $n^{th}$ active electrode, of the plurality of active electrodes, based on an $n^{th}$ distance between the $n^{th}$ active electrode and the one or more grounded electrodes, the first self-capacitance value being different from the $n^{th}$ self-capacitance value; a
    calculating a self-capacitance pattern of the plurality of active electrodes based at least on:
        a first position of the first active electrode on the first portion as biased by the first self-capacitance value, and
        an $n^{th}$ position of the $n^{th}$ active electrode as biased by the $n^{th}$ self-capacitance value; and
    determining a fold angle of a fold axis based at least on the calculated self-capacitance pattern.

14. The method of claim 13 further comprising:
    ascertaining an opening state of the foldable electronic device based at least on the calculated self-capacitance pattern.

15. The method of claim 13 further comprising:
    mapping the calculated self-capacitance pattern to corresponding angles of fold between the first portion and the second portion.

16. The method of claim 13 further comprising:
    determining corresponding angles of fold between the first portion and the second portion based at least on distances between the plurality of active electrodes.

17. The method of claim 13, wherein at least one fold axis is located at one of:
    a hinge portion of the foldable electronic device;
    a rollable portion of the foldable electronic device;
    a flexible portion of the foldable electronic device;
    a bendable portion of the foldable electronic device; and
    a foldable portion of the foldable electronic device.

* * * * *